Sept. 29, 1959     L. A. RICE     2,906,939
REGULATING CIRCUIT FOR GENERATORS
Filed April 28, 1958

INVENTOR.
Lyman A. Rice
BY
HIS ATTORNEY

United States Patent Office 2,906,939
Patented Sept. 29, 1959

2,906,939
REGULATING CIRCUIT FOR GENERATORS

Lyman A. Rice, Anderson, Ind., assignor to General Motors Corporation, Detroit, Mich., a corporation of Delaware Application April 28, 1958, Serial No. 731,186

1 Claim. (Cl. 322—27)

This invention relates to motor vehicle electrical systems, and more particularly to generator regulating circuits.

It is an object of this invention to provide a regulating circuit for a generator that is operative to reduce the output of the generator in response to excessive heating thereof.

Another object of this invention is to provide a current-regulating circuit for a generator including a current-regulating relay wherein the operation of the current-regulating relay is controlled as a function of generator temperature.

Still another object of this invention is to provide a current-regulating circuit for a generator wherein a load circuit is supplied through the coil winding of a current-regulating relay and is also supplied through a circuit that is in shunt with the relay coil winding and which includes a switch that opens in response to excessive heating of the generator. When the switch opens, the full load current passes through the current relay coil and the relay is then set into operation.

A further object of this invention is to provide a current-regulating circuit wherein the generator of the circuit may be overloaded until the generator heats up to a predetermined temperature whereupon the current output of the generator is reduced in response to the generator heating.

Further objects and advantages of the present invention will be apparent from the following description, reference being had to the accompanying drawings wherein preferred embodiments of the present invention are clearly shown.

Figure 1:
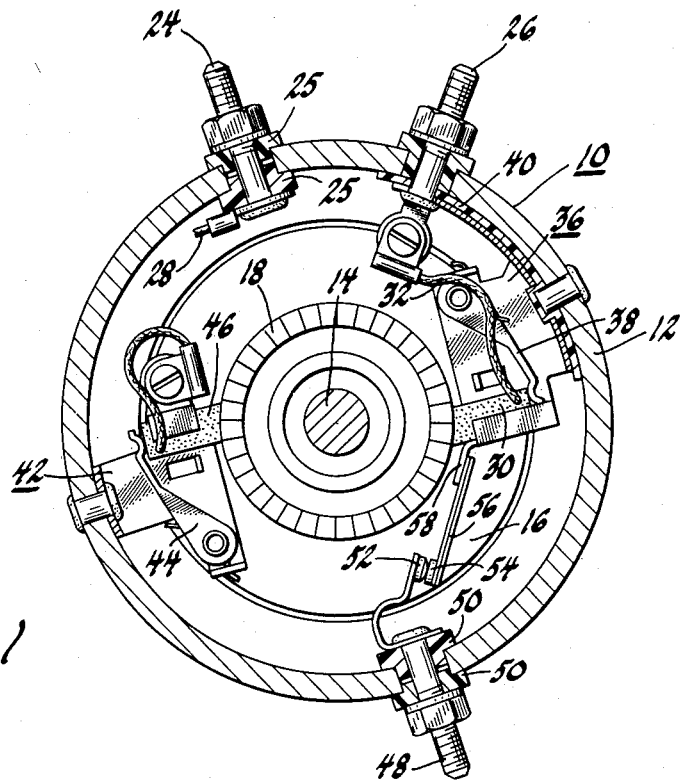
Fig. 1 is a vertical sectional view of a generator showing the location within the generator of the thermal switch that forms a component part of the regulating circuit illustrated in Fig. 2.

Referring now to the drawings and more particularly to Fig. 1, a direct-current shunt-wound generator generally designated by reference numeral 10 is shown. This generator has a main frame 12 and includes a shaft 14 and an armature 16. The shaft is suitably supported for rotation within a pair of end frames (not shown) in a manner well known to those skilled in the art. The armature 16 includes the usual laminated core on which is wound a conventional armature winding. The armature winding is electrically connected with a commutator 18 in a conventional manner, the commutator being supported by shaft 14. The generator also includes field windings 20 and 22 which are illustrated schematically in Fig. 2 and which are not shown in Fig. 1.

The frame 12 of generator 10 supports a field terminal stud 24 which is suitably insulated from the frame by insulating material 25, and also supports a generator terminal stud 26 which, in a like manner, is suitably insulated from the frame, as shown. These terminal studs take the form of threaded bolts, as shown, which pass through the insulating material that insulates the bolts from the frame.

The field terminal stud 24 is connected to one side of field windings 20 and 22 by a lead 28. The generator terminal stud 26 is connected with a brush 30 by a lead 32 and is connected to one side of field coil 20 by a lead 34. The brush 30 is held in engagement with commutator 18 by means of a brush holder generally designated by reference numeral 36 and including a pivoted member 38 that is spring biased in such a direction as to hold the brush in tight engagement with the commutator. This brush holder is of conventional design and is suitably insulated from the frame 12 of the generator by insulating material 40. A second brush holder generally designated by reference numeral 42 includes a pivoted lever 44 which constantly urges the brush 46 into tight engagement with commutator 18. The brush holder 42 is connected directly to frame 12 and brush 46 is, therefore, electrically connected with the frame 12. The frame 12 in common motor vehicle practice forms the ground connection for the generator and is connected to a suitable metal part of the motor vehicle which forms the ground circuit of the vehicle.

A third terminal designated by reference numeral 48 is provided. This terminal takes the form of a threaded bolt and is suitably insulated from frame 12 by insulation 50. The terminal stud 48 supports an electrical contact 52 which, at times, engages an electrical contact 54. The electrical contact 54 is supported by a bimetallic actuator 56 that is formed of two strips of dissimilar metal having different coefficients of expansion. The strips of metal are so arranged that the switch contacts 52 and 54 open when the bimetal 56 is heated above a predetermined temperature. The bimetal actuator 56 is supported by a tongue 58 that forms a part of the brush holder 36. It is to be noted that the bimetal 56 is in electrical contact with the brush 30 through the tongue 58 which forms a part of the brush holder 36. It is also to be noted that the bimetal 56 is supported closely adjacent the commutator 18 so as to be responsive to the temperature of the commutator and the brush holder 36. When the bimetal 56 is heated above some predetermined temperature it moves to separate contacts 52 and 54. At all other times the contacts 52 and 54 are held in engagement with one another. The function of the switch contacts 52 and 54 will be more fully described hereinafter in describing the circuit shown in Fig. 2.

Figure 2:
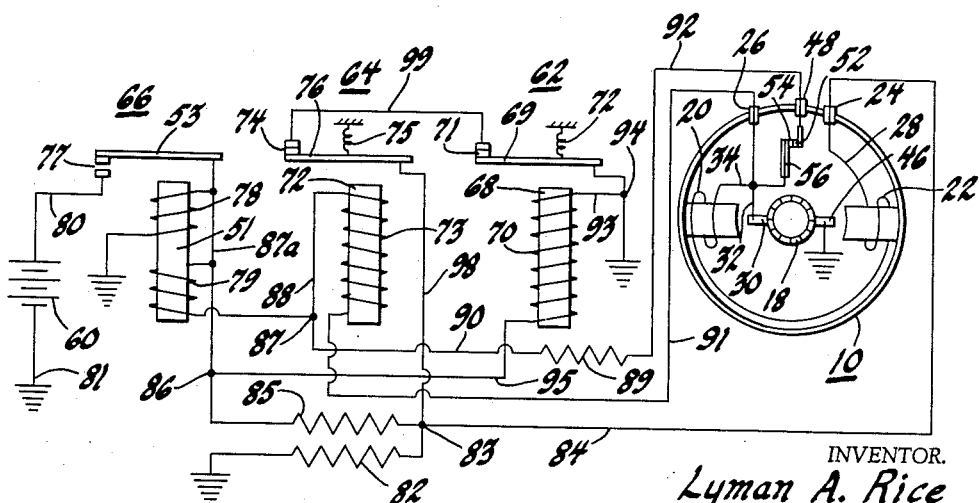
Fig. 2 is a schematic electrical diagram of a regulating circuit made in accordance with this invention.

Referring now more particularly to Fig. 2, the generator 10 is shown connected with a storage battery 60 through a regulating circuit that includes voltage-regulating relay 62, current-regulating relay 64 and cut-out relay 66. The voltage-regulating relay includes the usual iron core 68, an armature 69, a coil winding 70, and switch contacts 71 that are normally held closed by a spring 72, but which are opened whenever the coil winding 70 is energized sufficiently to attract armature 69 against the bias of spring 72.

The current-regulating relay includes the iron core 72, a coil winding 73, switch contacts 74, and a spring 75 that normally holds the switch contacts 74 closed until the armature 76 of the relay is attracted by sufficient energization of coil 73. The cut-out relay 66 includes iron core 51, armature 53, switch contacts 77, shunt coil winding 78 and series coil winding 79. When coil windings 78 and 79 are suitably energized, the switch contacts 77 are closed to complete a circuit to storage battery 60 through lead 80, the opposite side of the storage battery being grounded through lead 81.

The regulating circuit further includes the usual regulating resistor 82, one side of which is grounded and the other side of which is connected with junction 83. The junction 83 is connected directly with field terminal 24 via lead 84. The regulating circuit also includes a resistor 85 that is connected between junctions 83 and 86, the junction 86 being connected with a lead 87a that is, in turn, connected to one side of coils 78 and 79. The opposite side of coil 78 is connected directly to ground, as shown, whereas the opposite side of coil 79 is connected with a junction 87. The junction 87 is connected to one side of relay coil 73 by a lead 88 and is connected to one side of a resistor 89 by a lead 90. The opposite side of relay coil 73 is connected directly with generator terminal 26 via a lead 91. The other side of resistor 89 is connected directly with terminal 48 via a lead 92.

The voltage-regulating relay coil 70 has one side thereof connected with armature 69 via lead 93 which is connected with junction 94. This junction is connected directly to ground, as shown. The opposite side of relay coil 70 is connected with junction 86 via a lead 95.

The brush 30 of generator 10, as has been previously described, is connected to one side of field coil 20 and is also connected to switch contact 54 and thus is connected through this switch with terminal 48. The brush 30 is also directly connected with terminal 26. The brush 46 is connected directly to ground as is illustrated in Fig. 2 by reason of the fact that the brush holder 42 is connected directly to the frame 12 of the generator.

The operation of the regulating circuit of Fig. 2 will now be described. Assuming that the shaft 14 is being driven through suitable torque transmitting means by the engine of a motor vehicle, the generator 10 will develop a voltage at brushes 30 and 46. This voltage will be impressed across the voltage-regulating relay coil 70 and across the shunt winding of cut-out relay 66. The current supplied to battery 60 and to other electrical loads (not shown) flows through a circuit part of which has two parallel paths. The first of these paths consists of brush 30, lead 32, terminal 26, lead 91, current-regulating relay coil 73 and lead 88 to junction 87. The second path consists of brush 30, brush holder 36 which is common with terminal 26, tongue 58, bimetal blade 56, contacts 54 and 52, terminal 48, lead 92, resistor 89, lead 90 to junction 87. The circuit is completed for both paths from junction 87 through relay coil 79, lead 87a, armature 53, contacts 77 to battery 60 and to other electrical loads (not shown). It will be apparent that these two paths are in parallel with one another and the resistance of the paths is preferably of such a ratio that three-fourths of the total load current passes through lead 91, whereas one-fourth of the total load current passes through lead 92. It will be apparent, however, that this ratio might take other values by changing the resistance values of the two shunt circuits. It will also be apparent that the path provided through lead 92 is only effective to pass current as long as switch contacts 52 and 54 are closed.

Assuming now that the total load current is 40 amperes and that the current-regulating relay 64 is set to operate at 32 amperes, it will be apparent that the current-regulating relay will not operate under this condition as only 30 amperes are passing through lead 91 and through the current-regulating relay coil 73. If the temperature of the generator 10 now goes above a predetermined safe value, the bimetal 56 will move contact 54 out of engagement with contact 52 to open the circuit through lead 92. This circuit was formerly carrying 10 amperes and this 10-ampere current is now passing through lead 91 so that lead 91 is now carrying the total load current of 40 amperes. Since the current-regulating relay was set at 32 amperes, the current regulator will now begin its operation by attracting armature 76. The contacts 74, as is well known to those skilled in the art, will then be opened and closed rapidly due to the energization of relay coil 73 and due to the operation of spring 75. During the time that contacts 74 are closed, the field coils 20 and 22 are connected directly across brushes 30 and 46 by reason of the fact that the resistor 82 is now shorted out. This circuit may be traced via line 84, line 98, contacts 74, line 99, contacts 71, and thence to ground through the armature 69 of voltage-regulating relay 62. During the time the contacts 74 are open, the circuit for the field coils 20 and 22 is made via line 84 and through resistor 82 to ground. When the contacts are open, the resistor 82 is thus inserted in series with the field coils 20 and 22 to reduce the energization of the field coils and thus reduce the voltage output appearing across brushes 30 and 46. It thus will be apparent that the energization of relay coil 73 above a predetermined value operates to reduce the voltage output of generator 10. This permits the generator to operate at a lower output and thus permits the generator to cool down to a safe temperature whereupon the contacts 52 and 54 once more close to provide the second current path for current being supplied the electrical loads of the system from the generator 10.

The voltage-regulating relay 62 operates in a conventional manner in that contacts 71 are rapidly opened and closed during the time that coil 70 is energized with a voltage above a predetermined value. The coil 70 is connected directly across brushes 30 and 46 and thus responds to the terminal voltage of the generator. When the voltage-regulating relay 62 operates, the regulating resistor 82 is alternately shorted out and placed in series with the field coils 20 and 22 to regulate the energization of the field coils and thus regulate the output voltage of the generator.

The cut-out relay 66 operates in a conventional manner in that armature 53 is attracted to close contacts 77 whenever coils 78 and 79 are energized with a predetermined voltage and current respectively. When contacts 77 are closed, the storage battery 60 is connected in circuit with the brushes 30 and 46 of generator 10.

The function of the current-regulating relay 64 has previously been described in relation to the operation of thermal switch 56. It should be noted, however, that the current-regulating relay operates in a normal fashion when contacts 52 and 54 are closed, the purpose of the contacts 52 and 54 being to greatly increase the current flow through the relay coil 73 when the generator overheats. This insures that the current-regulating relay will always come into operation whenever the generator overheats. It will, of course, be apparent that the current-regulating relay can also operate when switch contacts 52 and 54 are closed as the current load, even with the divided current flow, may be of such a value as to initiate operation of the current-regulating relay.

The thermal switch 56 should be positioned within the generator so as to be near what is termed in the art as the "hot spot" of the generator. The "hot spot" of the generator may vary with certain designs and in some generators it has been found that this "hot spot" occurs in the commutator. For this reason the switch 56 is shown in Fig. 1 as being positioned closely adjacent the commutator 18. It will be apparent, however, to those skilled in the art that the switch 56 could be placed in other positions within the generator and is preferably placed closely adjacent the "hot spot" of a particular generator design.

From the foregoing, it will be apparent that the applicant has provided a regulating circuit arrangement wherein the voltage output of a generator is reduced upon overheating of the generator. It is to be noted that this arrangment does not completely cut off the output of the generator, but only reduces it for a period of time sufficient for the generator to cool down to a temperature that is of a safe value. It will also be appreciated that with the circuit described, the generator may be operated above its rated capacity until it heats up to a predetermined temperature. Thus, if the current regulator is set at the rated current capacity of the generator some additional current may be supplied through the circuit that includes resistor 89. This temporary overload is a controlled amount depending on the resistance values of coil 73 and resistor 89.

While the embodiments of the present invention as herein disclosed constitute a preferred form, it is to be understood that other forms might be adopted.

What is claimed is as follows:

In an electrical regulating circuit, the combination comprising, a direct-current generator having a frame, a field winding, an armature winding and a commutator, said frame supporting a field terminal, an armature terminal and a third terminal and supporting a pair of brushholders containing brushes that engage the commutator, means including one of said brushes connecting the field winding of said generator across the output terminals thereof, a current-regulating relay of the electromagnetic-vibratory type having a coil winding and having switch contacts in circuit with said output terminals and field winding for controlling the energization of said field winding from said output terminals, an electrical load, a first circuit for supplying current to said electrical load from said generator including said armature terminal and said relay coil winding, and a second circuit connected in parallel with said first circuit for supplying current to said electrical load from said generator including a switch and said third terminal, said switch comprising a bimetal actuator supported by one of said brushholders and a metal part supported by said third terminal, said bimetal actuator being positioned closely adjacent said commutator and operative to move away from said metal part when heated above a predetermined temperature.

References Cited in the file of this patent

UNITED STATES PATENTS

| | | |
|---|---|---|
| 1,400,501 | Conklin | Dec. 13, 1921 |
| 2,774,029 | Mittag | Dec. 11, 1956 |